United States Patent [19]

Wolf, Jr.

[11] Patent Number: 4,957,259

[45] Date of Patent: Sep. 18, 1990

[54] DOUBLE HOOKED UTILITY HANGER, WITH HANGER SUSPENSION HOLE

[76] Inventor: Edward J. Wolf, Jr., 4204 242nd St., SW, Mountlake Terrace, Wash. 98043

[21] Appl. No.: 311,869

[22] Filed: Feb. 17, 1989

[51] Int. Cl.⁵ ............................................. F16B 45/00
[52] U.S. Cl. .................................... 248/304; 211/119; 248/315
[58] Field of Search ................ 211/119, 118; 248/303, 248/304, 315

[56] References Cited

U.S. PATENT DOCUMENTS

| | | | |
|---|---|---|---|
| 981,270 | 1/1911 | Hurff | 211/119 X |
| 982,864 | 1/1911 | Phipps | 211/119 X |
| 1,255,776 | 2/1918 | Negus | 211/119 X |
| 1,516,024 | 11/1924 | Meyer | 248/303 X |
| 1,559,783 | 11/1925 | Rose et al. | 248/304 X |
| 1,616,013 | 2/1927 | Warren | 248/304 |
| 2,468,526 | 4/1949 | Tusay | 211/119 X |
| 3,488,025 | 1/1970 | Rowland | 248/304 X |
| 4,193,504 | 3/1980 | Berkowitz | 211/119 |

FOREIGN PATENT DOCUMENTS 476616 12/1937 United Kingdom ................ 248/315

Primary Examiner—David L. Talbott

[57] ABSTRACT

A double hooked utility hanger having a top attachment hook and a bottom suspension hook, each opposite one another along a connecting shaft, said ends rotated to be perpendicular to each other, or nearly so. A suspension hole is located centrally along the connecting shaft, opening on a plane perpendicular to the top attachment hook of the present invention. This suspension hole is the suspension point for a second and subsequent double hooked utility hanger, providing the means whereby the user may suspend a series of double hooked utility hangers, said series being suspended from a single attachment point from which is suspended the top attachment hook of the first member of the series. Any item capable of being stored in a suspended manner may be thus suspended from the bottom suspension hook of the present invention, either singly or multiply by use of the aforementioned series of double hooked utility hangers. Alternate embodiments include a treble hooked utility hanger, comprising a single top attachment hook connected to a three pronged connecting shaft, the lower two prongs terminating in a bottom suspension hook which provides the means whereby items capable of being stored in a suspended manner may be attached. Along said connecting shafts are located suspension holes for suspending subsequent multiple double or treble hooked utility hangers. An additional alternate embodiment comprises the bottom suspension hook of both the present invention and the preferred embodiment being rotated perpendicularly to said connecting shaft, providing the means for suspended storage of cups and other containers in a horizontal manner.

4 Claims, 4 Drawing Sheets

DOUBLE HOOKED UTILITY HANGER, WITH HANGER SUSPENSION HOLE

BACKGROUND OF THE INVENTION

1. Field of the Invention

The present invention relates in general to hooks and hanging devices, and in particular to double hooks, specifically hooks used in a system application for purposes of suspending a multiplicity of objects.

2. Description of Related Art

With the growing trend to utilize wall and storage space efficiently, there exists a need to suspend multiple objects from walls, doors and other support members, by using either a number of single hooks, each with its own attachment to the wall, or by use of a hanging system of hooks, made possible through the use of a carrier mechanism, which itself is the suspension point for a number of hooks.

Related art thereby requires the user to affix or otherwise attach each individual hook to the a support member, a time consuming and oftentimes damaging process to said support member. The present invention requires only a single attachment, that attachment able to support a vertical series of double hooked utility hangers, each with a suspension hole used for attaching subsequent hangers of the same design.

Other related art utilizes a carrier system attached to a support member, making possible the use of a multiplicity of hooks, however said carrier mechanism is expensive to produce. Neither this added expense nor the added mechanism is required for the present invention to provide a multiplicity of hanging points for the user.

Whatever the precise merits, features and advantages of the prior art, non of them achieves or fulfills the suspension purposes of the present invention, the double hooked utility hanger.

Accordingly, it is a principle object of the present invention to achieve a vertical series of hanging suspension points for items with a suspendable handle, such as cups and cookware as well as all other items capable of storage in a suspended mode. This series of hanging suspension points is accomplished by means of a series of hangers of design comprised within the present invention, the first hanger in the series attached to a wall or other support member by means of its top attachment hook hanging over or otherwise attached to a nail, peg or other secure attachment embedded in said support member. The second and subsequent hangers in the series attach to the preceeding hanger by means of insertion of the top attachment hooks of the subsequent hangers through the suspension hole of preceeding said hangers. Each member of said series is further comprised of a lower or bottom suspension hook, rotated on the connecting shaft of the present invention in such a manner as to facilitate the suspension of objects by hanging said objects from said bottom suspension hook.

It is an additional principle object of the present invention to provide an efficient means for the horizontal suspension of items, such as skiis, ladders and other objects, by means of two series of hangers of the present invention being hung at the same elevation at a sufficient distance apart to carry the load of said skiis, ladders and other objects requiring horizontal storage. By attaching second or subsequent hangers of the present invention by means of inserting the top attachment hooks of the subsequent hangers through the suspension hole of the previous hangers, a multiple series of objects can be stored in a horizontal and/or vertical suspended manner, either those requiring two horizontal hanging support points, and/or those requiring a single hanging support point.

It is a further principle object of the present invention to provide an economical and efficient means of devising a simple hanging storage system and foregoing the expense of manufacture of a carrier and/or a need for securing multiple attachment points for vertical members of the system. This system may be made as extensive as the user wishes, requiring only the needed number of double hooked utility hangers of the present invention, with each vertical series affixed to a single attachment.

Other and further objects, advantages and features of the present invention will be understood by reference to the following specification in conjunction with the annexed drawings, wherein like parts have been given like numbers.

SUMMARY OF THE INVENTION

The foregoing objects can be accomplished by providing a double hooked hanger of the present invention with hooked ends located opposite one another along a connecting shaft and said ends rotated to be perpendicular to each other, or nearly so. In the preferred embodiment of the invention a suspension hole is centrally located along this connecting shaft, said suspension hole opening on a plane perpendicular to the top attachment hook of the present invention. This suspension hole is the suspension point for a subsequent double hooked hanger of the present invention, for purposes of allowing the user to suspend a number of related or unrelated items in a vertical series. The suspension member of the present invention is compared of a lower or bottom suspension hook, rotated from the top attachment hook of the present invention in the aforementioned manner so as to facilitate the storage by suspension of any objects capable of being suspended.

DESCRIPTION OF PREFERRED EMBODIMENTS

Figure 1:
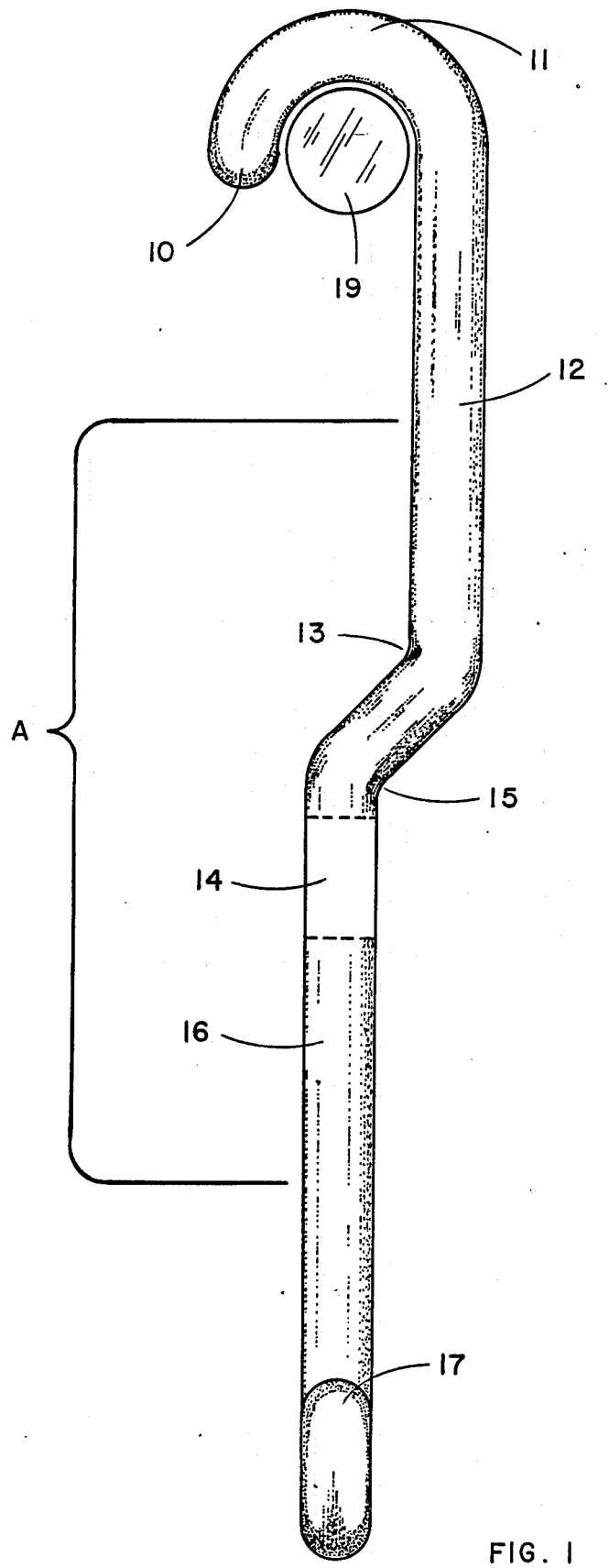
FIG. 1 is a front elevation of a double hooked utility hanger, in accordance with the present invention.
Figure 2:
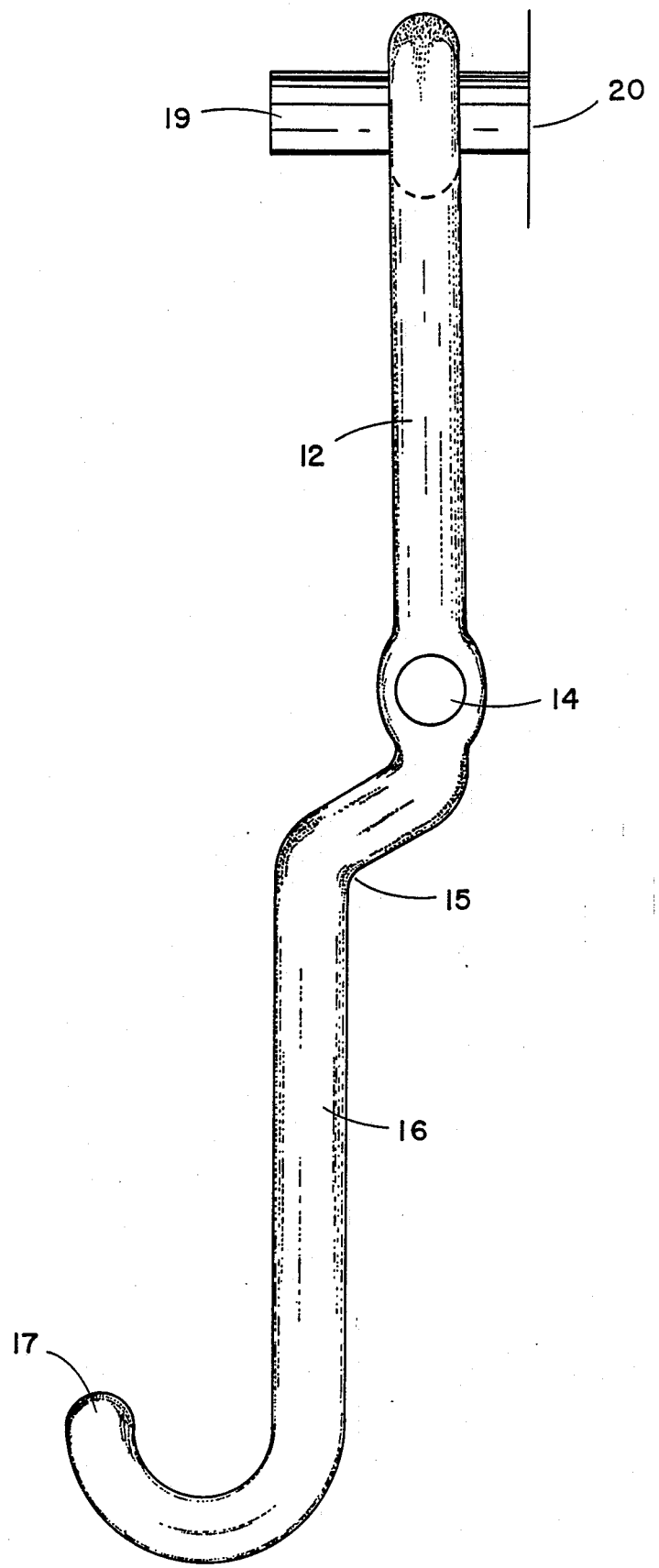
FIG. 2 is a side elevation of a double hooked hanger, in accordance with the present invention.

As shown in the drawings, the double hooked utility hanger in accordance with the present invention, shown in FIG. 1, comprises a top attachment hook 11, rotated 90 degrees, or toward a perpendicular position to a bottom suspension hook 17, shown in FIG. 2, said bottom hook 17 being attached to top hook 11 by means of a connecting shaft A. When used as the first hanger in a series, the top attachment hook 11 is suspended over a nail, peg or other secure attachment 19, attached to a wall, door or other support member 20. When used as the second or subsequent member in a series of hangers of the present invention, top attachment hook 11 is suspended from the suspension hole 14, located on the connecting shaft of the preceeding hanger of the present invention of the series.

Connecting the top attachment hook 11 is the connecting shaft A, comprised of the top connecting shaft 12, which in the preferred embodiment shown in FIG. 1 comprises a slight arc 13 for purposes of providing clearance for subsequent hangers of the present invention suspended in series.

Figure 3:
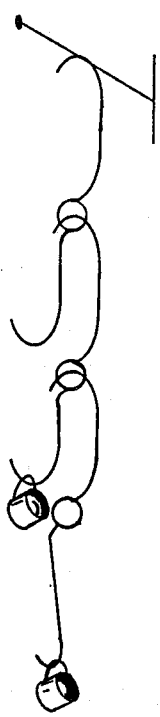
FIG. 3 is a side perspective perspective of a vertical series of double hooked utility hangers, in use, in accordance with the present invention.

Directly below arc 13 is the suspension hole 14, of sufficient diameter to allow for insertion of the top attachment hook 11 of the second and subsequent hangers of the present invention when suspended in series as shown in FIG. 3. The suspension hole 14 opens on a plane perpendicular to the top attachment hook 11, parallel to the plane of the secure attachment 19, and perpendicular to the plane of the support member 20, as shown in FIG. 2.

The position of suspension hole 14 allows said top attachment hooks of multiples of the present invention to be positioned along the same lateral plane when multiple numbers of the present invention are used in series, whereby the top attachment hooks of the second and subsequent hangers of the series are inserted through the suspension hole of the preceeding hangers of the series. Additionally, said bottom suspension hooks of hangers of the present invention in a series are all located along the same general vertical plane. In the preferred embodiment of the present invention the suspension hole 14 is circular, however it is the intent of this invention to include all sizes and shapes of suspension holes of sufficient size to allow for passage of subsequent hangers in a series. In the preferred embodiment of the present invention this suspension hole 14 is located at the center point along the length of the present invention, however this suspension hole may be located anywhere along shafts 12 or 16.

Below suspension hole 14 is shaft 16, comprising a slight arc 15 shown in FIG. 2 for the purpose of clearance for subsequent members of a series of hangers of the present invention. Shaft 16 terminates in bottom suspension hook 17, rotated on the connecting shaft 16 90 degrees or toward a perpendicular aspect from the plane of the top attachment hook. This rotation allows the suspension apparatus of the present invention to be positioned in a perpendicular or approaching perpendicular manner to the support member 20, and parallel to the secure attachment 19, facilitating the suspension of cups, cookware, coiled rope, wires and any object capable of being stored in a suspended manner.

FIG. 3 illustrates the present invention used in a series, providing the user with multiple suspension points for storage of items. This method of use facilitates of any item with a curved or looped handle, or other means of a suspension attachment, such as cups, cookware and tools which can be suspended on the present invention by inserting hook end 18 through such handle or suspension attachment. In addition the present invention allows for the suspended storage of any item which can be stored in a suspended manner, such as potholders and dishrags.

Figure 4:
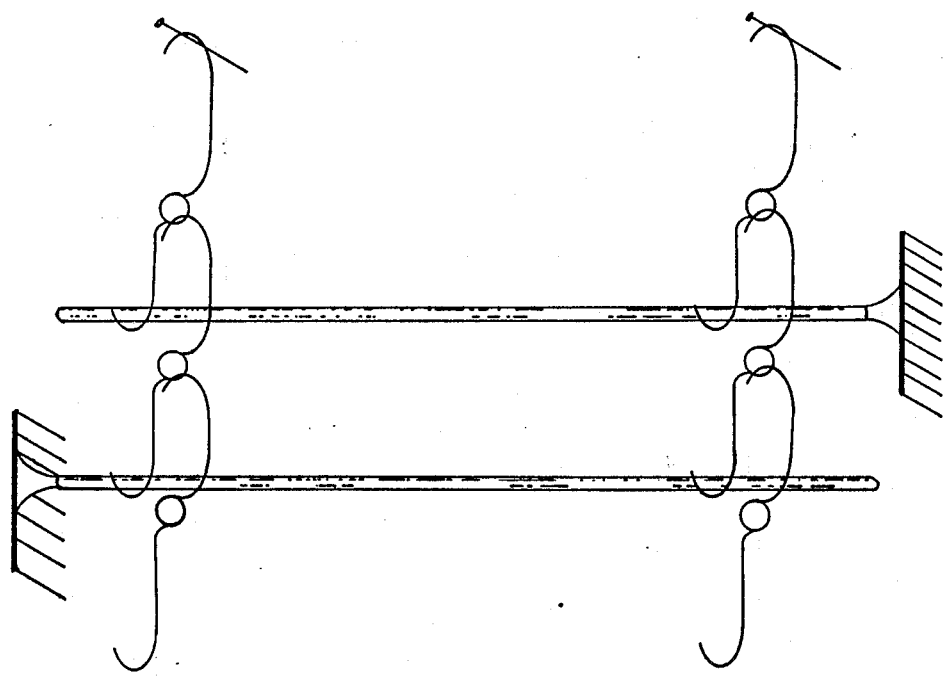
FIG. 4 is a side perspective of a parallel series of double hooked utility hangers, showing hotizontal storage capabilities of the present invention.

FIG. 4 further illustrates the present invention, in two parallel series, for use when suspending objects suitable for horizontal storage, such as ladders, rakes, skiis and other objects.

The present invention is constructed from a single piece of tubular molded plastic or cast metal, of sufficient diameter to safely carry intended loads, although alternate embodiments may comprise square or other shaped molded plastic or cast metal. The overall length of the present invention may vary according to intended use, from under eight inches long for hanging cups and utensils, to over 36 inches long for ladders and suspension of larger items.

While preferred embodiments of the present invention have been shown and described herein, it will be obvious that such embodiments are provided by way of example only. Numerous variations, changes and substitutions will occur to those skilled in the art without departing from the present invention. Several alternative embodiments are presented here to illustrate such substitutions.

DESCRIPTION OF ALTERNATIVE EMBODIMENTS

Figure 5:
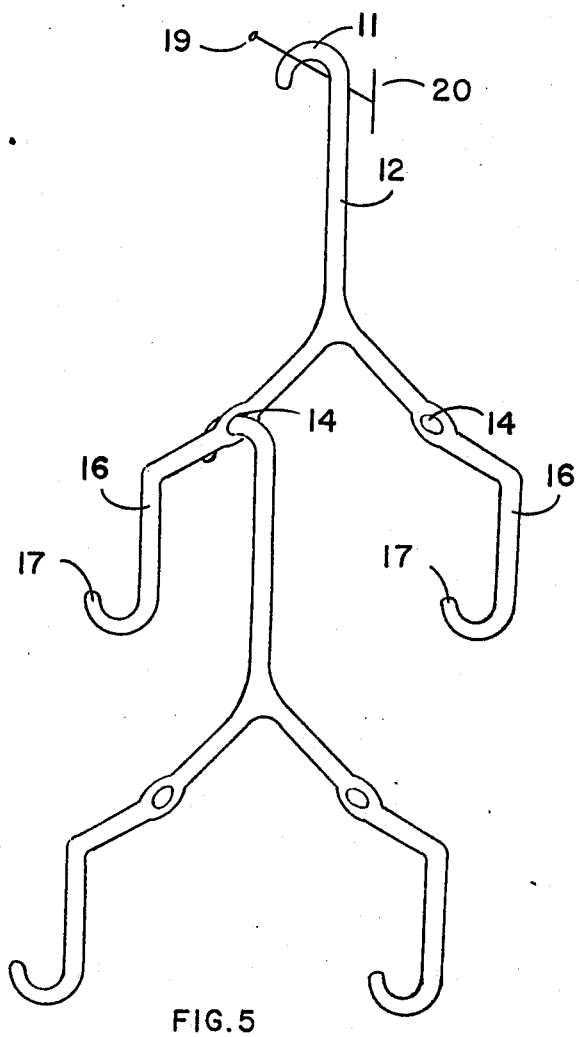
FIG. 5 is a front perspective of a series of triple hooked utility hangers, an alternative embodiment of the present invention.

FIG. 5 illustrates a series of treble hooked utility hangers, each comprising a hooked attachment end 11 and two hooked suspension ends 17 connected by a three pronged connecting shaft 8, along which are located suspension holes 14, such holes supplying suspension points for additional double or treble hooked hangers of the present invention, providing a multiple series of bottom suspension hooks 17, suspended from a single attachment point 19. Rotation of the suspension hooks 17 is perpendicular, or nearly so, to the top attachment hook 11, consistent with the rotation of the opposing ends of the double hooked hanger of the present invention. Suspension holes 14, located either singly along upper shaft 12, or in pairs along lower shafts 16, open on a plane perpendicular to the top attachment hook 11 and perpendicular to the plane of the support member 20, in a manner consistent with said suspension holes of the preferred embodiment of the present invention.

Figure 6:
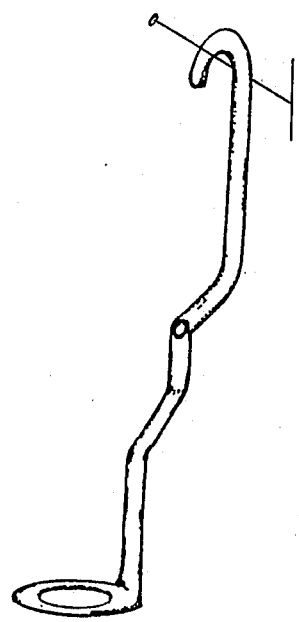
FIG. 6 is a side perspective of a lower looped-suspension ended utility hanger, an alternative embodiment of the present invention.

FIG. 6 illustrates an additional alternative embodiment for the bottom suspension hooks 17 of the double hooked hanger in the preferred embodiment of the present invention and the treble hooked hanger in the alternative embodiment shown in FIG. 5. In this alternative embodiment the bottom suspension hook 17 may be elongated to form a loop, rotated so as to hang perpendicularly to the connecting shaft, providing the means whereby cups or other containers may be suspended in a horizontal manner.

While noting several alternative embodiments to the present invention, it is intended that the invention be limited only by the spirit and scope of the appended claims.

I claim:

1. A hooked means for the suspension of a multiplicity of objects requiring a single attachment to a support comprising:
   a. a vertically extending connecting shaft;
   b. a top hooked attachment end extending from said connecting shaft;
   c. an offset immediately below top hooked attachment end of said connecting shaft positioned so as to align said connecting shaft and suspended load beneath attachment point;

d. a bottom hooked suspension end extending from said connecting shaft and rotated on a 90 degree aspect from said top attachment end;

e. a suspension hole centrally located along said connecting shaft, below the top attachment end offset, for the purpose of suspending added members of the present invention to form a vertical series of suspension points; and f. an offset in said connecting shaft beneath the suspension hole, so as to position the suspension end foward of the top attachment end of any subsequent member of the series suspended from the suspension hole in said connecting shaft.

2. A hooked means for the suspension of a multiplicity of objects requiring a single attachment to a support comprising:

a. a vertically extending connecting shaft;

b. a top hooked attachment end extending from said connecting shaft;

c. an offset immediately below top hooked attachment end of said connecting shaft positioned so as to align said connecting shaft and suspended load beneath attachment point;

d. a bottom looped suspension end extending from said connecting shaft and rotated on a perpendicular aspect from said connecting shaft, for purposes of suspending containers of compatible diameter;

e. a suspension hole centrally located along said connecting shaft, below the top attachment end offset, for the purpose of suspending added members of the present invention to form a vertical series of suspension points; and f. an offset in said connecting shaft beneath the suspension hole, so as to position the suspension end foward of the top attachment end of any subsequent member of the series suspended from the suspension hole in said connecting shaft.

3. A hooked means for the suspension of a multiplicity of objects requiring a single attachment to a support comprising:

a. a three-pronged vertically extending connecting shaft;

b. a top hooked attachment end extending from upper prong of said connecting shaft;

c. an offset immediately below top hooked attachment end of said connecting shaft positioned so as to align said connecting shaft and suspended load beneath attachment point;

d. two bottom hooked suspension ends extending from the two lower prongs of said connecting shaft and rotated on a 90 degree aspect from said top attachment end;

e. a suspension hole located along each said lower prong, above each suspension end, and below the top attachment end offset, for the purpose of suspending added members of the present invention to form a series of suspension points; and f. an offset in said connecting shafts beneath the suspension hole, so as to position the suspension ends foward of the top attachment end of any subsequent member of the series suspended from the suspension hole in said connecting shaft.

4. A hooked means for the suspension of a multiplicity of objects requiring a single attachment to a support comprising:

a. a three-pronged vertically extending connecting shaft;

b. a top hooked attachment end extending from upper prong of said connecting shaft;

c. an offset immediately below top hooked attachment end of said connecting shaft positioned so as to align said connecting shaft and suspended load beneath attachment point;

d. two bottom looped suspension ends extending from the two lower prongs of said connecting shaft and rotated on a perpendicular aspect from said connecting shaft, for purposes of suspending containers of compatible diameter;

e. a suspension hole located along each said lower prong, above each suspension end, and below the top attachment end offset, for the purpose of suspending added members of the present invention to form series of suspension points; and f. an offset in said connecting shafts beneath the suspension hole, so as to position the suspension ends foward of the top attachment end of any subsequent member of the series suspended from the suspension hole in said connecting shaft.

* * * * *